Figure 1:
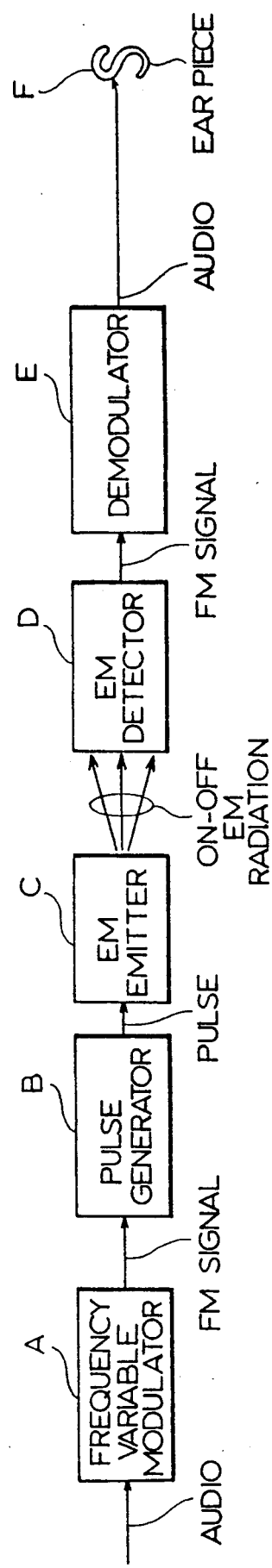

United States Patent [19]

Griffin et al.

[11] Patent Number: 5,020,155
[45] Date of Patent: May 28, 1991

[54] AUDIO COMMENTARY SYSTEM

[75] Inventors: Robert J. Griffin, Richmond HIll, Canada; Steven R. Chalmer, Buffalo, N.Y.

[73] Assignee: Heritage Communications Inc., Richmond Hill, Ontario, Canada

[21] Appl. No.: 422,659

[22] Filed: Oct. 17, 1989

[51] Int. Cl.$^5$ .................. H04B 10/00; G02F 2/00
[52] U.S. Cl. ................... 455/617; 455/603; 455/608; 455/615; 455/151; 381/79
[58] Field of Search ............ 455/617, 600, 603, 601, 455/608, 615, 618, 151, 152, 166; 250/226, 338.1; 381/79; 379/56; 360/12

[56] References Cited

U.S. PATENT DOCUMENTS

| | | | |
|---|---|---|---|
| 3,050,630 | 8/1962 | Bird | 455/617 |
| 3,351,761 | 7/1962 | Hamby et al. | 455/615 |
| 3,660,762 | 5/1972 | Smith | 455/41 |
| 3,900,404 | 8/1975 | Dachs | 455/617 |
| 3,927,316 | 12/1975 | Citta | 455/615 |
| 4,163,123 | 7/1979 | Brodsky et al. | 455/617 |
| 4,885,804 | 12/1989 | Mayle | 455/615 |

Primary Examiner—8
Assistant Examiner—Kinfe-Michael Negash

[57] ABSTRACT

Orator units are associated with particular exhibit or guiding locations and provide an audio commentary by the medium of ON and OFF states of electromagnetic radiation. Auditor units are portable units associated with paritcular viewers or users and are adapted to detect the electromagnetic radiation and produce therefrom the audio commentary. The auditor unit may be designed to signal, the orator through ON or OFF states of electromagnetic radiation the request for a commentary. The orator unit may be designed to provide a commentary in response to the auditor request. An orator may be designed to provide a plurality of commentaries on corresponding frequency modulation (FM) channels (which are converted to and from electromagnetic radiation) and the orator and auditor may be designed so that the orator may tune the auditor to demodulate only the FM channel corresponding to the auditor's selected type and time of commentary. A plate encoded with conducting and non-conducting areas may be used to encode an auditor unit to cause it to select the type commentary desired by a viewer or user.

31 Claims, 11 Drawing Sheets

TO EARPHONE

TO EARPHONE

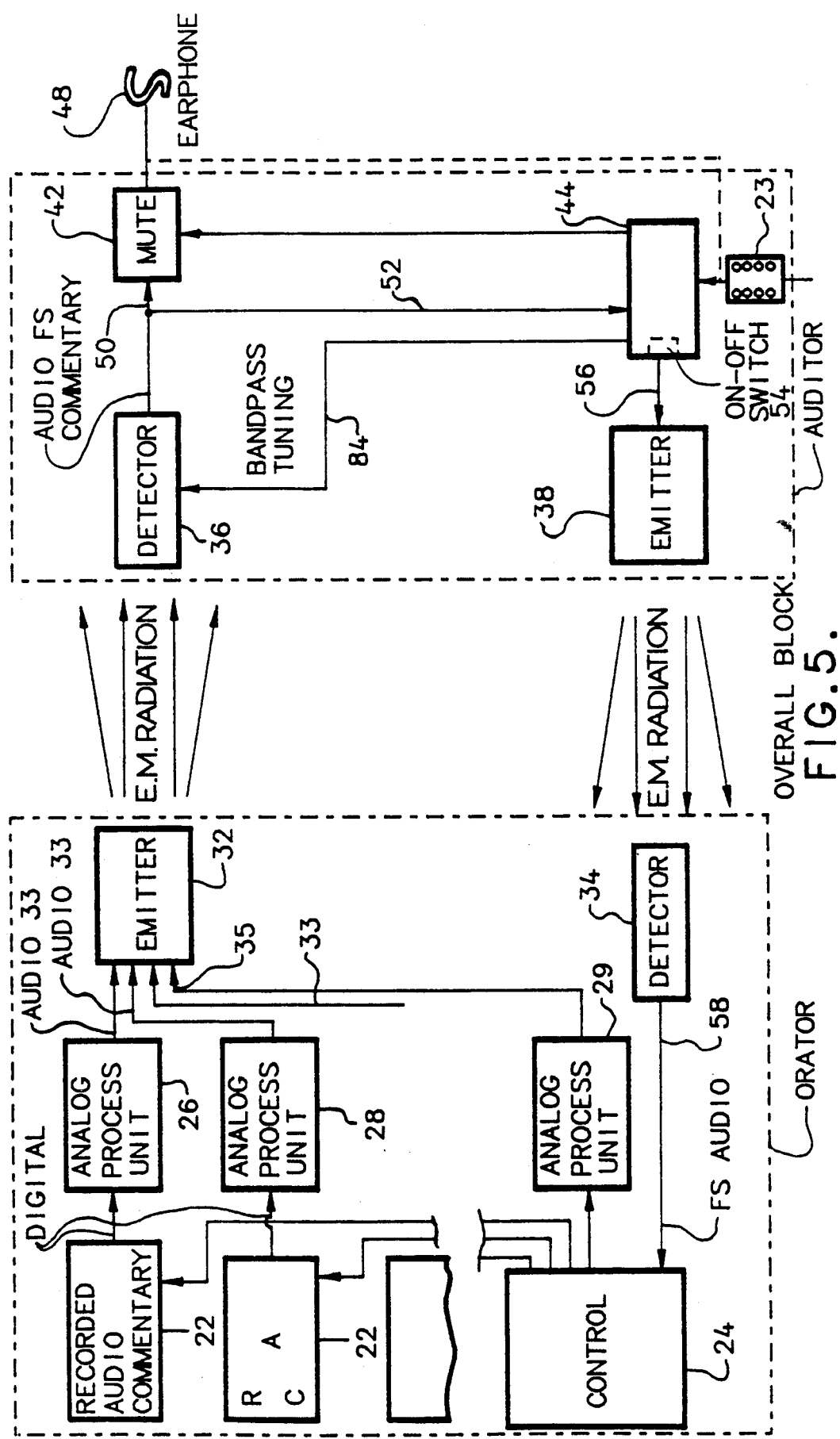

AUDIO COMMENTARY SYSTEM

This invention relates to means and a method for providing audio commentary to accompany exhibits of various kinds and to act as an audio guide and/or to provide directions to destinations.

Exhibits which may form the environment for the invention include: art galleries, museums, zoos and fairs or merchandise locations.

At such exhibits it is frequently desireable that an audio commentary often viewer actuated, accompany the specific exhibit. Such audio commentaries are now commonly provided by (1) a spoken audio commentary, usually actuable by a push button accompanying each exhibit, or (2) a hand held radio receiver or (3) a tape carrier coupled with an earphone which directs the carrier to follow a specified route and (assuming he does this) provides him with a description of those exhibits selected by the exhibitor rather than the viewer. All previous systems suffer from the limitation that the 'depth' of the commentary is invariable, or usually so, that is, using an art exhibit as an example, the commentary cannot take into account the fact that one viewer may wish a description in Spanish rather than English or that one viewer may only wish to know the name of the artist and the title and the year of the work while another viewer may wish to know extensive detail about the history and the character of the work. The 'spoken' commentary suffers from the disadvantage that it is heard in a single language and of single 'depth' by those who wish it and those who do not. The tape carrier suffers from the disadvantage that the exhibits and the order of viewing was selected by the exhibitor rather than the viewer. The hand held radio receiver allows the viewer some leeway as to the order of viewing exhibits but there will only be one commentary per exhibit at a time determined by the exhibitor or by the first viewer to call for commentary. Both types suffer from the disadvantage that the variety of talks and the number of lanuages available is necessarily limited. The exhibit located 'speaker' suffers from the disadvantage that only one commentary may be provided at a time, with a start at a time determined by either the exhibitor or the first of a number of viewers, so that all or some of the viewers are compelled to commence listening to a commentary already in progress.

Many of the disadvantages of the above prior systems might be overcome by radio transmission to viewer's hand held receivers. However, such system would encounter interference if individual commentaries were sent to different viewers at the same exhibit while the provision of the same commentary to all viewers is undesireable for a number of reasons previously outlined.

This application uses the following definitions: An 'orator' or 'exhibit unit' is associated with a specific exhibit or guiding location and its primary purpose is to transmit (over the medium to be described) an audio commentary about a specific exhibit. It will usually be mounted to be stationary relatively close to the exhibit.

An 'auditor' is a portable unit with earphone carried by a viewer of one or more exhibits or a person asking for guiding assistance. Its primary purpose is to receive the audio commentary over the medium to be described and to provide to the viewer's earphone the audio commentary.

'Frequency variable signals' means radio signals where the information is signalled by frequency or frequency change. Included in the term are frequency modulation (FM), frequency shift keying (FSK) (both of which are used in the preferred embodiment of the invention), phase modulation, and other conventional methods but also includes burst signalling where signalling is performed by the presence or not of a burst of signals at a predetermined frequency.

This invention in one aspect provides for communication between an orator, and an auditor associated with the viewer. The communication will be by electromagnetic radiation in the wavelength range of 1600–400 nanometers (nm). The radiation is switched between ON and OFF states to carry the signal which in turn carries the audio commentary. The orator converts a recorded audio commentary into a frequency variable signal which in turn is converted into the switched radiation and the auditor is designed to detect the switched radiation and reproduce frequency modulated signals from which the audio commentary may be derived.

The frequency modulated stages respectively, intermediate the audio signal and the EM radiation at the exhibit unit and between the EM radiation and the audio signal at the auditor may be tuned to several frequency channels (e.g. as in the preferred embodiment into four commentary and a protocol channels). With four commentary channels the exhibit unit may transmit different or time shifted commentaries to different auditors at the same exhibit, on different frequency channels. It should be emphasized that 'frequency channels' refers to the frequency varying signals carrying audio (and in some cases protocol) signals imposed on the radiation by ON-OFF switching and has nothing to do with the frequency of the electromagnetic radiation switched ON and OFF. Thus a number of channels may be used to simultaneously provide different language commentaries, different 'depth' commentaries or the same commentary at different times selected by different auditors.

Thus, given the plurality of frequency channels, each exhibit may be provided with different language commentaries and different depth commentaries.

In a preferred form of the invention the auditor is also provided with means to supply switched ON-OFF EM radiation in the aforesaid frequency range. Thus, the auditor may be actuated by the viewer to indicate; by the switched beam, the type of commentary desired; at the time the viewer requires it. Although, this may be achieved by controls attached to the auditor, for many applications it is preferred to provide the auditor with the same selection for the whole exhibition. Thus, in certain states the viewer might have the choice (on four channels) of the following commentaries:

English—In depth
English—Salient particulars
Spanish—In depth
Spanish—Salient particulars The preferred method of operation assumes that the viewer will make the same selection for all exhibits.

The viewer on receiving his auditor is preferably provided with a separate device, such as a key which may be fitted in a slot in the auditor case. The key is encoded to cause the auditor to transmit to the orator a signal identifying the service requested. The orator is designed to indicate to the auditor by an identifying signal, the channel to tune to. The orator is then designed to transmit to the auditor the commentary requested on the selected channel. This may be repeated with the separate orator at each exhibit. At each exhibit thus there may be auditors equal to the number of auditor channels each hearing a different, or differently time-shifted commentary on its own channel.

Figure 2:
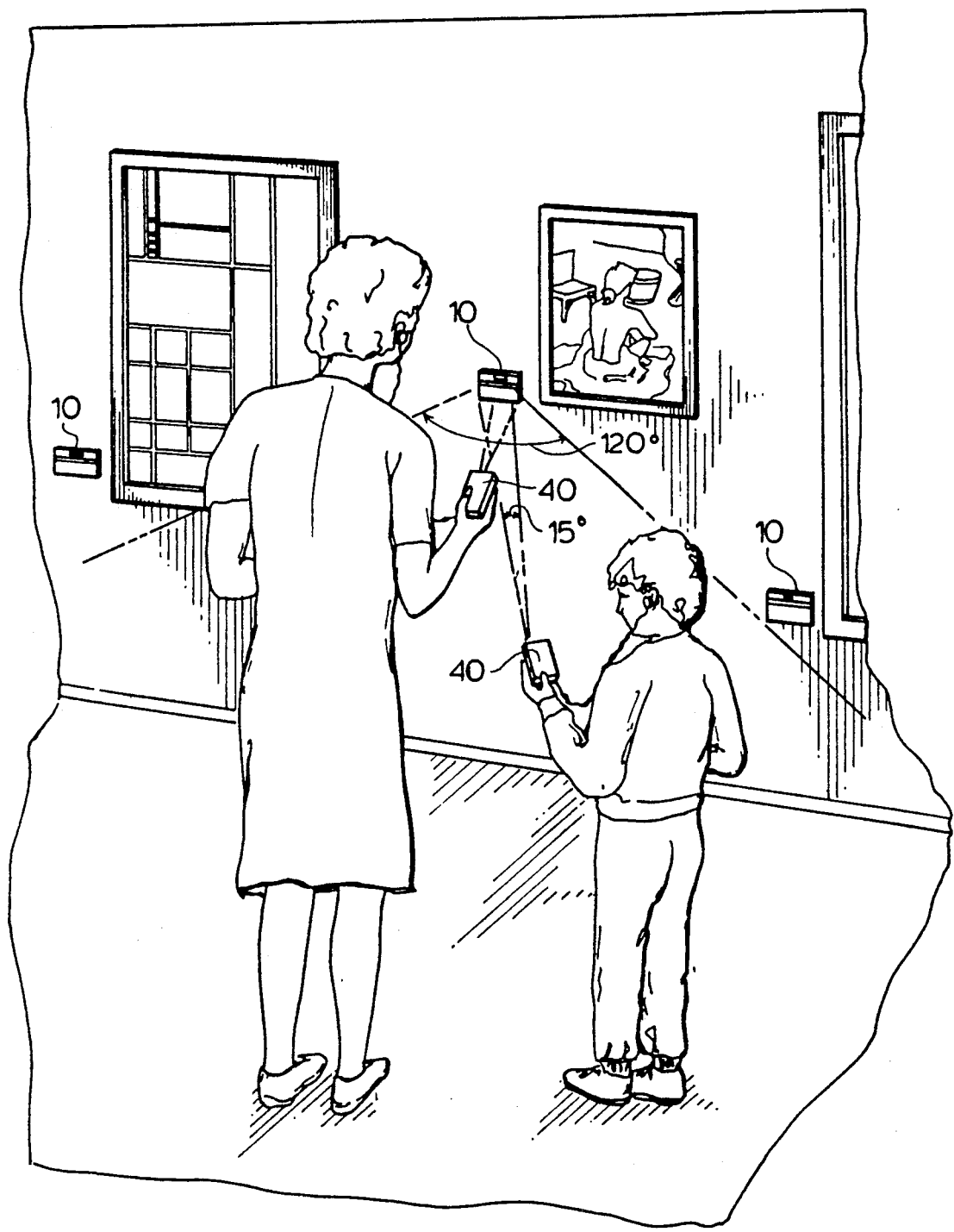
Figure 3:
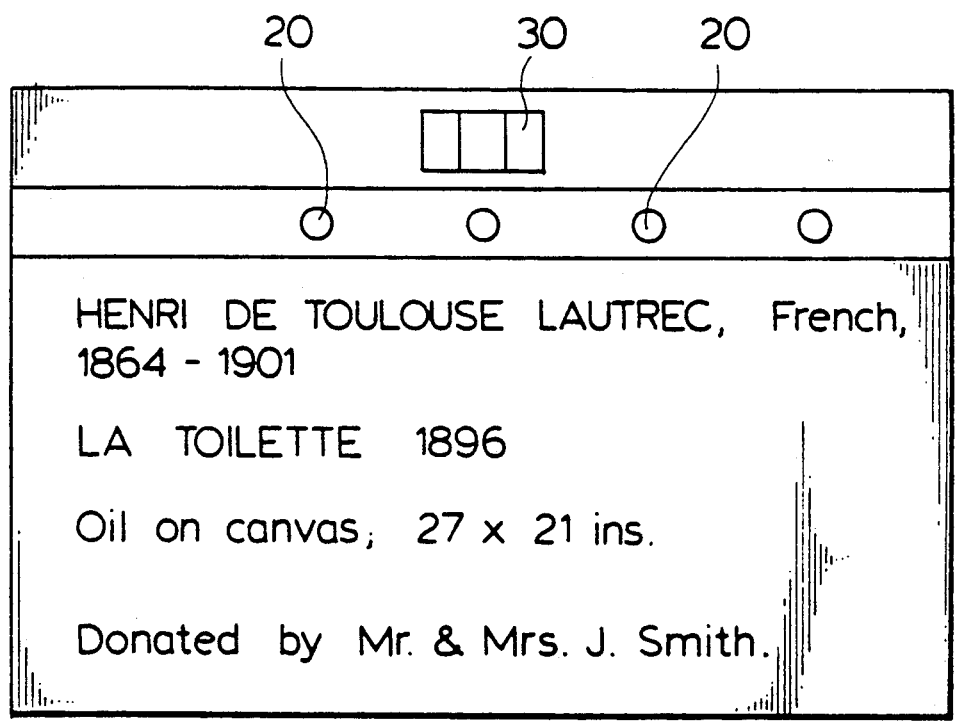
Figure 4A:
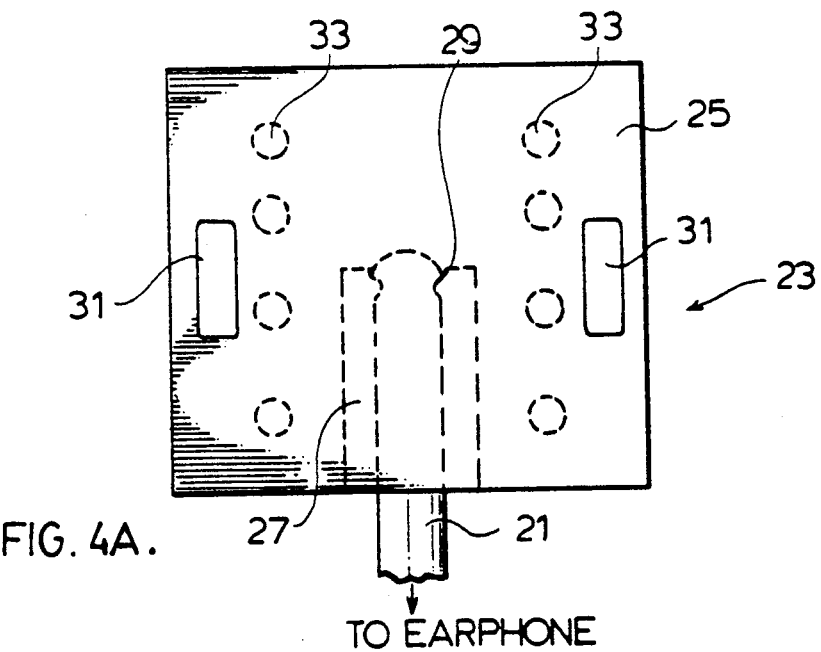
Figure 4B:
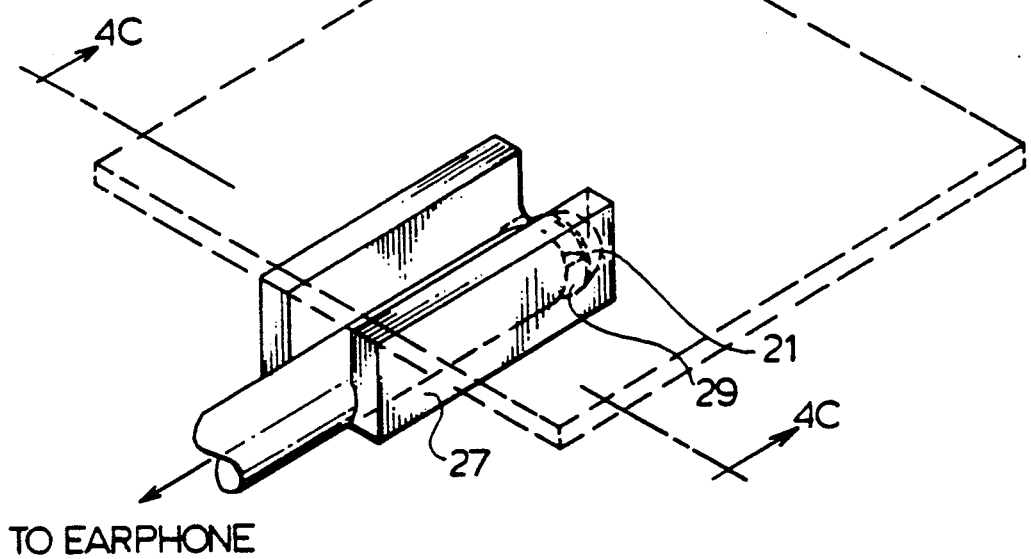
Figure 4C:
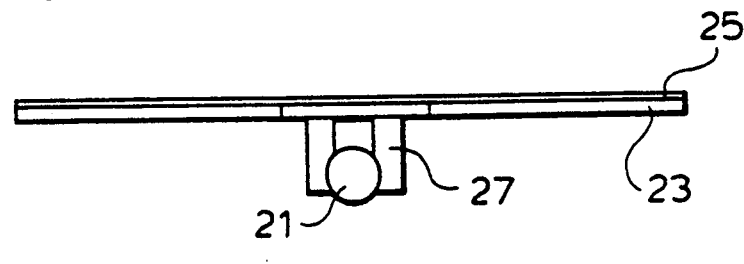
Figure 6:
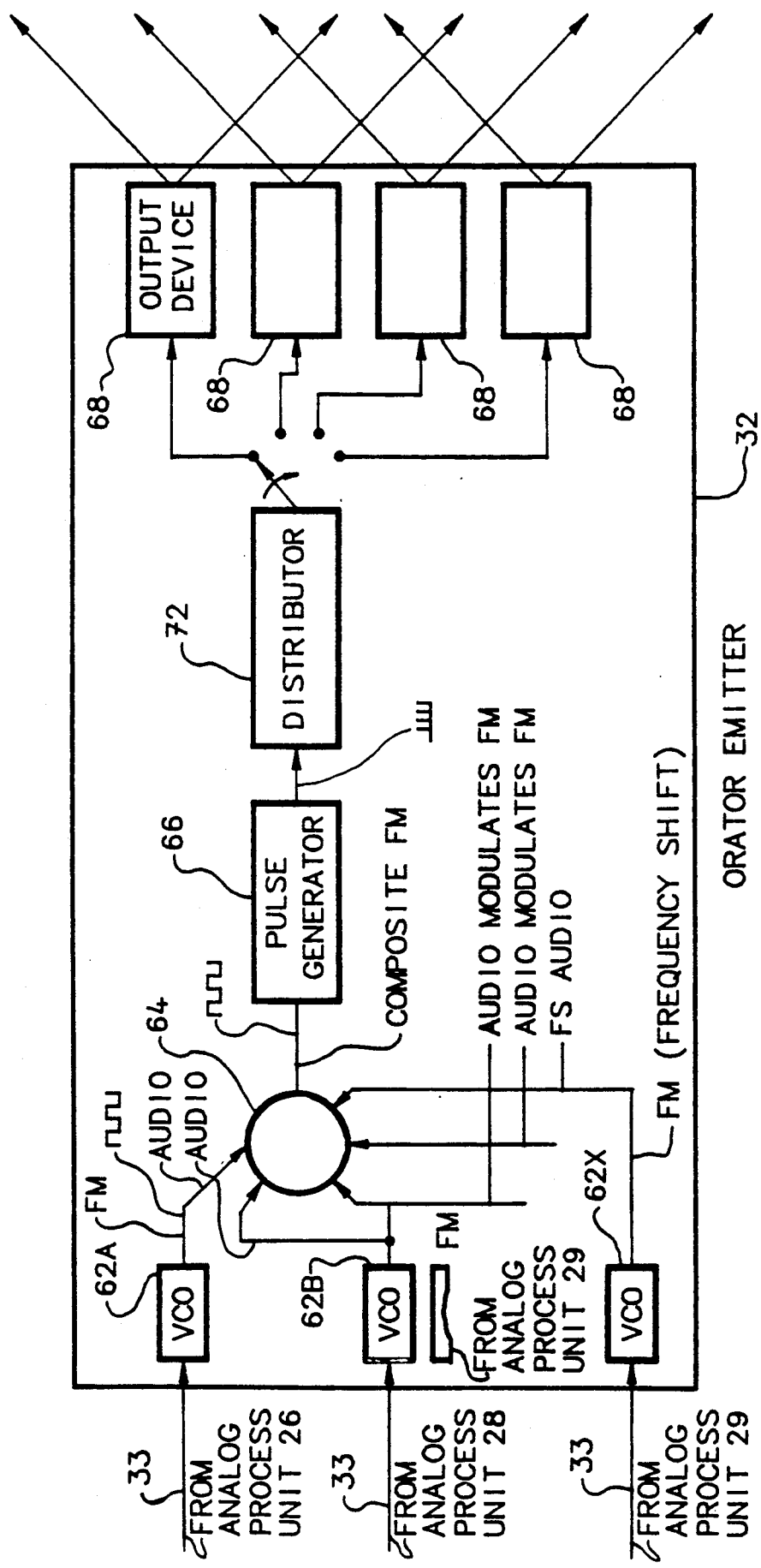
Figure 7:
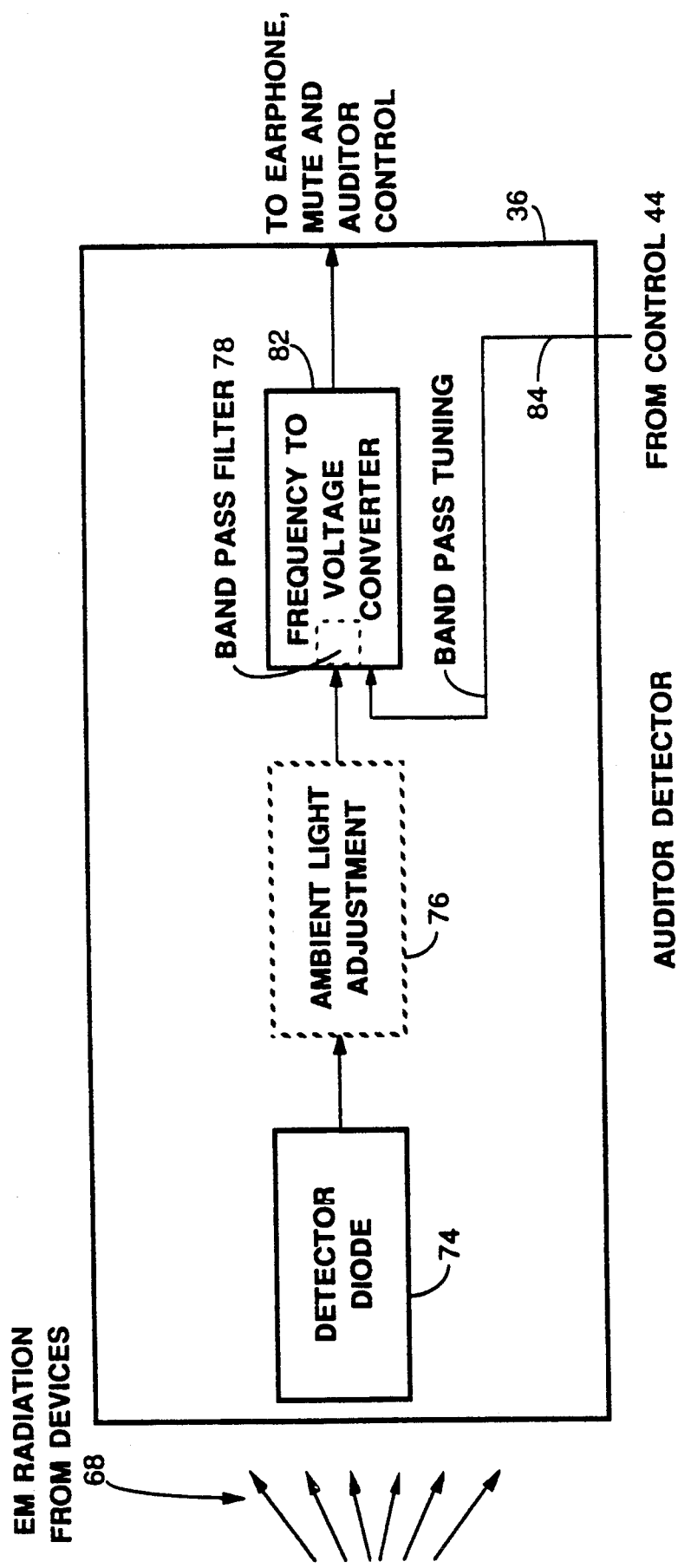
Figure 8:
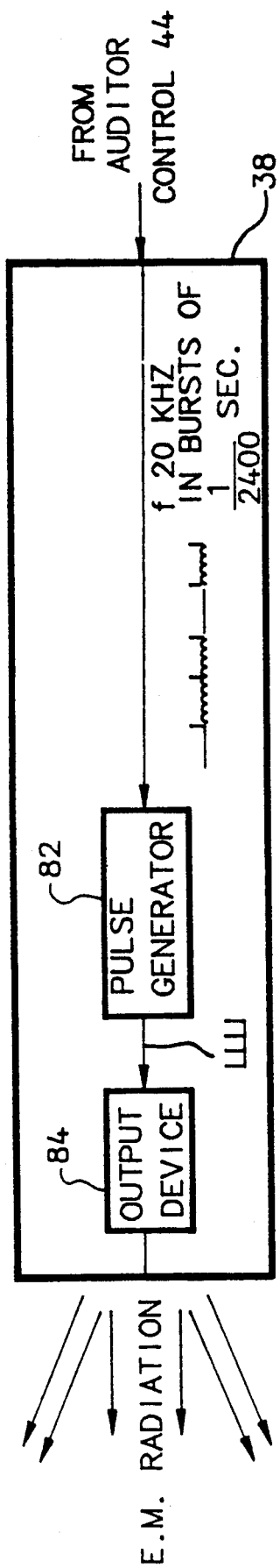
Figure 9:
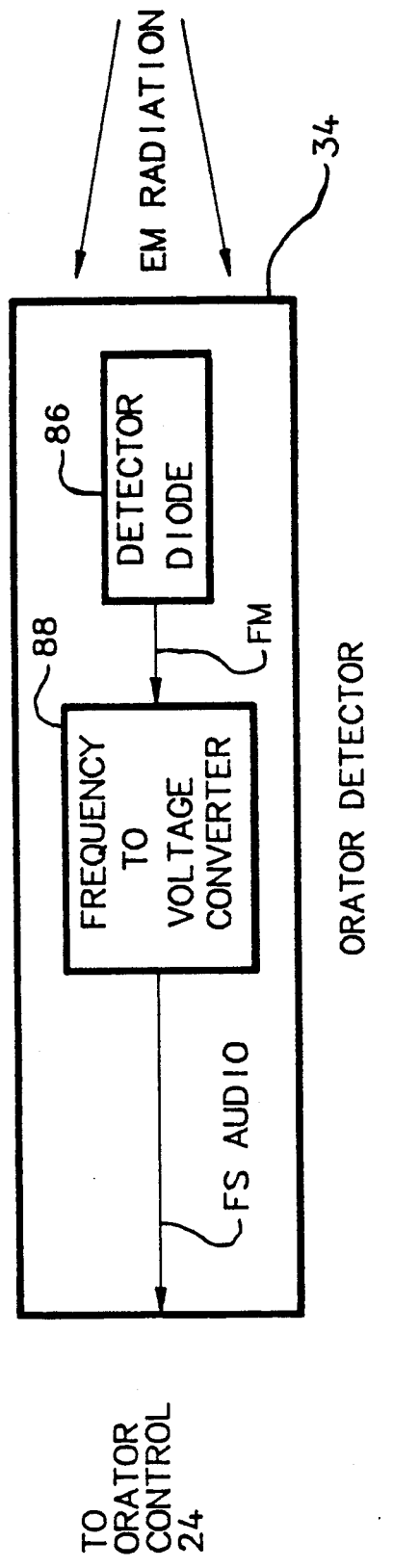

In drawings which illustrate a preferred embodiment of the invention:

FIG. 1 is a skeletal illustration of the broad aspects of the invention,

FIG. 2 is a partially schematic view showing an exhibit, an exhibit unit, and viewers with auditor units, FIG. 3 is an enlarged view of the label of FIG. 1 showing the exterior of the wall panel, FIG. 4A is a plan view of the key, FIG. 4B is a partial perspective view showing the key attached to the jack, FIG. 4C is a view along 4C—4C of FIG. 4B, FIG. 5 is a block diagram of a preferred orator and auditor, FIG. 6 is a block diagram of an orator emitter, FIG. 7 is a block diagram of an auditor detector, FIG. 8 is a block diagram of an auditor emitter, FIG. 9 is a block diagram of an orator detector.

FIG. 1 is a skeletal demonstration of the broad aspects of the invention. In its broad aspects the invention is designed at the orator to take an audio commentary and provide a frequency variable modulation therefrom at A. Although, the frequency variable signal might be phase modulated (or use another frequency variable system) in fact the preferred applications of the invention use a frequency modulated ('FM') signal. At B the frequency modulated ('FM') signal is converted to pulses. At C the pulses are used to provide ON and OFF states of the EM radiation radiated by the emitter. At D the detector for EM radiation in the auditor unit, the ON-OFF states of the EM radiation are reconverted to the frequency modulated (FM) signal. At E the frequency modulated (FM) signal is demodulated to provide the audio which the viewer hears in his earphone.

FIG. 2 schematically illustrates three pictures at an art gallery. To the viewer's left of each picture is the label 10. As shown in FIG. 3 the label 10 includes the visual description of the work, together with a strip having four orator emitter outlets 20 and a detector input 30. As schematically illustrated in FIG. 2, the electromagnetic EM beam of each orator emitter encompasses a solid angle of about 120° so that the viewer must stand within this arc to receive the commentary. Also shown in FIG. 2 is the auditor box 40 designed to emit to the exhibitor unit over an included angle of 15°. This is large enough so that from predictable locations the viewer may point his auditor roughly at the picture so that the auditor emitter may signal by EM radiation that the viewer desires the commentary. Although the technical description has not been provided as yet, it may be considered that the lady viewer in FIG. 2 is receiving a commentary on the exhibit in English from the orator emitter and the boy viewer is receiving a commentary in Spanish from the same orator emitter.

FIGS. 4A–4C show the earphone jack 21 and the key 23 in the form of a rectangular plate attached thereto. The rectangular plate 23 has a block 27 mounted on its lower surface shaped and designed to attach to the jack groove 29 with a snap action. Plate 23 is made of conducting material provided with an insulating surface 25. The insulating surface is etched or otherwise absent to provide a pair of exposed conducting areas 31 of plate 23. The plate is designed when clipped to the jack to be inserted in a key receiving slot, not shown, in the auditor assembly not shown. When so inserted contacts in the auditor box 40 ground the plate through areas 31. Only one grounding area 31 is required and the second is provided to assure grounding. In eight locations 33 exposed areas may or may not be provided grounding or not eight corresponding contacts, not shown in auditor box 40. The selection of conducting or non-conducting status for each area 33 gives 256 alternate encodings to the auditor control. However, in the preferred embodiment, a much lesser number of commentaries would be available for each exhibit. Four have been mentioned, i.e. either a salient or in depth commentary in Spanish or English. Thus in the preferred embodiment it is assumed that the viewer selects the same service for all exhibits at his 'tour' or 'visit', that he is presented with the key, with conducting—non-conducting areas 33 to encode the auditor controller to signal to the exhibit panel the commentary type desired. (Within the broad aspects of the invention there are non-preferred variants on this where an auditor box may be designed to select a different commentary type at each exhibit and the key is omitted).

The block diagram of a preferred arrangement is shown in FIG. 5. Four audio commentaries 22 are stored in digital form. The control 24 determines when each audio commentary 22 is supplied to a corresponding analog processing unit each of which converts its digital input into the desired audio signal carrying the commentary. These audio signals are supplied to the emitter 32 along lines 33. Frequency shift audio signals converted from control 24 digital signals at analog processing unit 29 are also supplied by control 24 to emitter 32 along line 35. These audio signals will be of two frequencies (for binary '1' and binary '0') of audio frequencies selected to be near opposite ends of whatever bandwidth range is selected for the frequency modulation. The orator emitter is designed (as hereinafter described) to convert the input audio signals into ON-OFF states of EM radiation in the range 950–800 nanometers and to radiate it over an azimuth angle of 120°.

An auditor unit held within the 120° radiation angle and directed toward the orator will detect the EM radiation at detector 36. Detector 36 provides, from the EM radiation audio commentary and audio frequency shift signals through mute 42 to the earphone 38 along line 50 and to control 44 along line 52. Control 44 is designed when receiving frequency shift signals along line 52 to 'mute' or shut off the audio to the earphone, and at other times, when the audio commentary is being transmitted it is passed to the earphone 48.

Again, at the control 44, the key 23 determines the audio commentary desired by the viewer. Thus, when the viewer operates his ON-OFF switch to 'ON' control 44 is adapted to send a digital signal along line 56 to emitter 38. Such digital signal causes the emitter 38 to radiate EM radiation, also in the 950 to 800 nanometer range over a 15° azimuth angle which, when received by the orator detector 34 provides frequency shift audio along line 58 to control 24.

FIG. 6 shows the orator emitter 32. Signals from each analog process unit 26, 28, 29 travel along lines 33 through VCO, 62A, 62B, . . . 62X. Each VCO 62 applies its audio a separate frequency channel which is the audio frequency modulated on a carrier. Suggested carrier center frequencies are:

| | |
|---|---|
| Channel 1 | 20 KHZ |
| Channel 2 | 35 KHZ |
| Channel 3 | 50 KHZ |
| Channel 4 | 65 KHZ |
| Channel 5 | 80 KHZ |

The VCO outputs are superimposed at mixer 64 where a dedicated protocol channel is used, this will usually be that of lowest frequency (here 20 KHZ). In this situation the auditor will be designed to tune to the 20 KHZ channel in the absence of tuning signals from the orator 64 and the composite FM signal is supplied to pulse generator 66 which provides the frequency modulated rate pulses to create corresponding ON states in the ON-OFF signalling provided by EM radiation from output devices 68.

The pulse generator 66 converts the square wave output from adder 64 into pulses. Although the circuitry could be designed so that the pulses corresponded only to the rising or falling edges of the square wave it is preferred to produce a pulse on each of the rising and falling edge of the square wave. It is noted that the pulses thus appear at twice the frequency of the onput signal. The pulses are preferably of about 2 μ duration. The output of a device 68 or (of a selected device 68) is designed to provide EM radiation, in its ON state, during the duration of the pulses and to be in its OFF state at other times.

The output device 68 may be any device responsive to the pulses to produce an ON state with the desired wavelength EM radiation responsive to the presence of a pulse and an OFF state during its absence. The present preferred device is a light emitting diode (LED) which emits EM radiation of the desired wavelength. With such a device it is found desireable to reduce its "duty cycle". Thus with the preferred output device we prefer to provide the distributor 72 to receive the signal from the pulse generator 66 and cyclically send it to each of four devices 68 so that each is responding to the output of the pulse generator 25% of the time.

In the preferred embodiment the distributor is by each pulse to cyclically connect the next output device.

FIG. 7 shows the auditor detector. As shown in FIG. 7 the ON state of the EM radiation from devices 68 activate detector diode 74 in the detector 36. The detector 74 provides a higher voltage and lower (or zero) voltage respectively responsive to the ON and OFF states of the received radiation. The detector 74 voltage may optionally be corrected at ambient light adjustment 76 to compensate for ambient light conditions in accord with techniques well known to those skilled in the art. The resultant voltage signal is supplied through bandpass filter 78 to frequency to voltage convertor 82. The bandpass filter is necessary to select, from the composite signal received, the desired channel. It is noted that the composite signal could comprise four audio FM including one protocol (frequency shift) FM channel and the filter is designed to select the desired one of these in accord with signals supplied along line 84 from auditor control 44. The selected signal is demodulated at frequency to voltage convertor 82 to produce the audio commentary for the earphone 48 or the frequency shift audio signal for a control 44. If the frequency to voltage convertor is, as is preferred, a phase locked loop, this device tends to lock to the frequency to which it is tuned and acts as its own bandwidth filter. Thus the phase locked loop is tuned to operate at the selected FM carrier frequency and tries to match the input pulse frequency with the result that an error signal is produced. The error signal represents the audio or frequency shift signals modulated on the carrier at the orator. Because the carrier signal at the orator emitter was effectively doubled when converted to pulses, the central frequency of the auditor phase locked loop 82 must also be twice the original carrier frequency. However, the resultant error signal in the auditor phase locked loop will properly represent the audio signal, the 'doubled frequency' effect acting merely to increase the noise immunity of the pulse stream.

The audio output of loop 82 is thus connected to power the earphone to provide the frequency shift audio signals to the auditor control 44.

FIG. 8 shows the auditor emitter 38. It is feasible to provide that the auditor emitter will frequency modulate frequency shift signals on a carrier for conversion to pulses, as in the orator emitter 32 treatment of the signals from VCO 62X. However, as shown in FIG. 8 it is preferred to use the present or absence of bursts of 20 KHZ signals at 2400 baud. The binary signalling is achieved by the presence or absence of the burst over successive 1/2400 second intervals. Accordingly, the bursts are converted at pulse generator 82 into bursts or not of pulses over the same intervals, and such pulses and their absence respectively create the ON and OFF states of output device 84 which preferably uses the same type of LED as output devices 68.

Since use of the output device 84 only takes place for a brief initial period, only one device 84 will usually be required FIG. 9 shows orator detector 34. Detector diode 86, is similar to detector diode 74 and detects the ON-OFF states of the EM radiation from the auditor emitter. The output of the detector 86 is provided as an voltage signal to frequency to voltage convertor 88 which operates in a similar manner to auditor convertor 82 and produces the presence or absence of 1/2400 second 20 KHZ bursts to the orator control 24. The control 24 in a manner well known to those skilled in the art will be designed to recognize the 8 or more bursts of 20 KHZ signals and to extract the binary signalled intelligence. When only one protocol channel is transmitted by all auditors, no bandpass filter function will normally be required although it may be present or provided.

If frequency shift signalling were used at the auditor emitter then such frequency shift signals would be recaptured at the orator detector.

It will be noted that if there are two or more channels being broadcast in the composite signal by orator emitters contemporaneously from the same exhibit unit to a corresponding number of auditors then each auditor will receive other EM signals superimposed on its own. In the preferred form of the invention a protocol signal sent by a emitter with a specific auditor's ID code plus encoded tuning instruction is used to tune the reference frequency of the phase locked loop 82 to the desired specified channel frequency, (which as stated will be twice the frequency of the corresponding orator channel). This reference frequency causes the phase locked loop 82 to lock to the FM signal centered on the channel frequency to the exclusion of the FM signals of other frequencies represented in the composite signal.

In operation it is assumed that there will be available at each exhibit, 5 channels. In the preferred embodiment, any commentary or protocol may be placed on any of the frequency bandwidth channels and any of the audio protocol channels may be signalled by the orator emitter as part of the composite signal. The auditors will customarily all transmit on a single FM protocol channel and the orator will customarily use the lowest FM channel to send protocol signals to the auditor.

With an viewer's insertion of his key and earphone jack the auditor control 44 is encoded by the key to ask for the commentary selected by the viewer when he got the key. When the viewer switches his ON-OFF switch to 'ON', the auditor-orator dialogue will be initiated.

The typical auditor-exhibit unit dialogue will be:

| Step | Origin | Channel | Message | Comment |
|---|---|---|---|---|
| 0 | Auditor | | | User having inserted jack and key; presses start button on auditor unit |
| 1 | Auditor | Protocol | Query | |
| 2 | Orator | Protocol | Who are you | |
| 3 | Auditor | Protocol | ID + Service Selected | Auditor control supplies encoded auditor identification, intrinsic to the unit and encoded designation of service determined by users' key |
| 4 | Orator | Protocol | ID + Go to Channel (N) | Encoded signal causes Auditor frequency -to- voltage convertor to tune to channel as selected by orator controls. -- Use of ID ensures that only identified auditor is tuned to channel. Other auditors ignore command without their I.D. |
| 5 | Orator | Channel (N) | | Transmits selected commentary on tuned channel |

In operation and overall concept then, at a given exhibition, each viewer selects the type of commentary (e.g. language or depth) which he wishes to hear and is provided with an auditor and combined earphone and key, the latter insertable with the earphone jack. The insulating and conducting pattern on the key, when the latter is inserted, will encode the auditor control 44 unit to request the desired type of commentary. The viewer walks from exhibit to exhibit, as and when he wishes and in any order. When the viewer wishes to have a commentary about a specific exhibit, he directs his auditor emitter at the exhibit (since its 15° EM radiation angle will then include the orator detector) and turns the ON-OFF button to ON. The protocol dialogue occurs as previously described and the orator assigns a channel, tunes the viewer's auditor convertor 82 to the selected channel, then transmits on the selected channel the commentary about that exhibit by ON-OFF EM radiation states. It will be noted that, at a given exhibit, the selected commentary may be provided to two viewers on separate channels, each with a start time determined by the respective operation of their ON-OFF switches. Thus, as is well known, the orator control 24 may time multiplex two time-shifted readings of the same commentary from the same digital memory for transmission to different viewers over different FM channels. At the same time other viewers ( up to the number of FM commentary channels) may be receiving the same or different commentaries over an individual channel. If a viewer asks for a commentary about an exhibit and all that exhibit unit orator channels are in use, the auditor may be programmed on receiving no commentary within a given interval to provide an audible 'busy' signal to the auditor earphone. The auditor may then be reactivated at a later time by operation of the ON-OFF switch, to request the commentary. The use of separate FM channels means that a viewer will only hear the desired commentary through his auditor regardless of the number of commentaries simultaneously emanating from the same orator.

If desired, the auditor may be provided with means for automatically shutting down the audio to the earphone if the received signal is below a certain level, indicating that the viewer is standing further from the exhibit than desired by the institution. Thus, by control of the level, the institution may control the area occupied by viewers of an exhibit.

There has thus been described the invention primarily from the point of view of the provision and reception of exhibit commentaries. Where the orators and emitters are used for a guiding function, the orators are located at suitable locations along preferred routes. The auditor unit is actuated by operation of its ON-OFF switch when directed at a particularly located orator. The orator is then adapted to provide audible guiding directions.

Where the orator is used for guiding a viewer through a large museum or other area a map may be provided to the viewer so that he may point at a selected orator corresponding to a map location corresponding to his desired map destination. The corresponding orator may then broadcast audio directions by EM radiation which the auditor converts to audio directional instructions. In a more sophisticated arrangement, the corresponding orator may broadcast, by EM radiation, a numerical code which programs software in the auditor. The coded auditor may then be pointed at successive orator locations which will broadcast successive directions in combination with the numerical code to continue to guide the viewer with the coded auditor. Each successive orator location will broadcast also directions to other locations but each with its own numerical code so that any coded auditor will only produce in audio directions to the selected destination for which it has been encoded, as an audible signal to the auditor's earphone by the ON-OFF EM signalling already claimed. In a preferred embodiment of the invention, certain orators are combined with maps so that, when the viewer points his auditor at a map location (e.g. "the 'Lion House'") the map orator is designed to program the auditor unit with a numerical code corresponding to the lion house. At other orator locations will by ON-OFF EM signalling, be given to many destinations but only those for the 'Lion House' will be prefaced by the corresponding numerical code. The directions so prefaced will give directions to the 'Lion House' from the orator location.

We claim:

1. An exhibit commentary system including an orator—associated with such exhibit and a portable auditor:

said orator being adapted to provide transmission of electromagnetic radiation in the wavelength range 1600–400 nanometers, said auditor being designed to detect said transmission, said orator being adapted to signal information derived from frequency variable signals through ON-OFF states of said radiation, said auditor being adapted to detect said ON-OFF states and convert them into electrical signals, said orator being designed, to transmit a recorded audio commentary as said information, said auditor being designed to convert such electrical signals derived from said detection into audio signals, wherein said orator is adapted to transmit on one of a plurality of frequency range channels of such frequency variable signals for signalling said information.

2. An exhibit commentary system as claimed in claim 1 wherein, prior to transmitting a commentary, said orator is designed to transmit a signal indicative of the channel selected and said auditor is adapted, responsive to said channel-indicative signal to selectively tune to the indicated channel.

3. An exhibit commentary system as claimed in claim 2 wherein a plurality of commentaries are available for transmission by said orator.

4. An exhibit commentary system as claimed in claim 3 wherein said orator is adapted to select one of said programs and to assign a channel thereto.

5. An exhibit commentary system as claimed in claim 1 wherein a plurality of commentaries are available for transmission by said orator.

6. An exhibit commentary system as claimed in claim 5 wherein said orator is adapted to select one of said commentaries and to assign a channel thereto.

7. An exhibit commentary system as claimed in claim 1 wherein a plurality of auditors are each responsive to different identification codes and wherein said orator is designed to transmit a signal carrying said identification code to cause response by the receiver corresponding to said code.

8. An exhibit commentary system including an orator—associated with such exhibit and a portable auditor:

said orator being adapted to provide transmission of electromagnetic radiation in the wavelength range 1600–400 nanometers, said auditor being designed to detect said transmission, said orator being adapted to signal information derived from frequency variable signals through ON-OFF states of said radiation, said auditor being adapted to detect said ON-OFF states and convert them into electrical signals, said orator being designed, to transmit a recorded audio commentary as said information, said auditor being designed to convert such electrical signals derived from said detection into audio signals, wherein said orator is adapted to transmit on at least three frequency range channels, at least one of said channels being a protocol channel and at least two of said channels being commentary channels, and said auditor is adapted to receive said protocol channel and tunable to a selected one of said program channels, said auditor being responsible to an orator signal on said protocol channel to tune to a selected one of said commentary channels.

9. An exhibit commentary system as claimed in claim 8 wherein said auditor is adapted to send a start signal on a protocol channel that it wishes to commence reception of a commentary and wherein said orator is adapted responsive to signals on said last-mentioned protocol channel to transmit a signal on a protocol channel to tune said auditor to a program channel and transmit a program therein.

10. An exhibit commentary system as claimed in claim 9 wherein said auditor is provided with means for selecting one of said commentaries and means to signal such selection along with said start signal and said orator is responsive to said selection signal to transmit the auditor-selected program on the—selected channel.

11. An exhibit commentary system including an orator—associated with such exhibit and a portable auditor:

said orator being adapted to provide transmission of electromagnetic radiation in the wavelength range 1600–400 nanometers, said auditor being designed to detect said transmission, said orator being adapted to signal information derived from frequency variable signals through ON-OFF states of said radiation, said auditor being adapted to detect said ON-OFF states and convert them into electrical signals, said orator being designed, to transmit a recorded audio commentary as said information, said auditor being designed to convert such electrical signals derived from said detection into audio signals, wherein a plurality of auditors are provided responsive to different identification codes and wherein said orator is designed to transmit a signal carrying said identification code to cause response by the auditor corresponding to said code.

12. In an exhibit commentary system having an orator associated with an exhibit adapted to broadcast an audio commentary by means of a variable frequency signal and for operation in conjunction with a portable auditor responsive to receipt of the variable frequency signal to produce the audio commentary;

a line-of-sight communications link between the orator unit and auditor including means, associated with said orator, for converting said variable frequency signal into interrupted electromagnetic radiation in a wavelength range of 1600–400 nanometers wherein ON and OFF states of said radiation are used to convey said variable frequency signal information and wherein, said auditor is adapted to detect said radiation and reproduce therefrom said variable frequency signal, wherein said auditor is adapted to discontinue production of said audio signal when the variable frequency signal derived from said detected signal is below a predetermined level.

13. In an exhibit commentary system having an orator associated with an exhibit adapted to broadcast an audio commentary by means of a variable frequency signal and for operation in conjunction with a portable auditor responsive to receipt of the variable frequency signal to produce the audio commentary;
a line-of-sight communications link between the orator unit and auditor including
means, associated with said orator, for converting said variable frequency signal into interrupted electromagnetic radiation in a wavelength range of 1600-400 nanometers wherein ON and OFF states of said radiation are used to convey said variable frequency signal information and wherein, said auditor is adapted to detect said radiation and reproduce therefrom said variable frequency signal, wherein said orator is adapted to provide said variable frequency signals in a plurality of bandwidth channels.

14. An exhibit commentary system as claimed in claim 13 wherein, prior to transmitting an audio commentary, said orator is designed to provide a frequency variable signal indicative of the channel selected and said auditor is adapted, responsive to detection of said channel indicative signal to selectively tune the indicated channel.

15. An exhibit commentary system as claimed in claim 14 wherein a plurality of commentaries is available for transmission by said orator.

16. An exhibit commentary system as claimed in claim 15 wherein said orator is adapted to select one of said commentaries and to assign a channel thereto.

17. An exhibit commentary system as claimed in claim 13 wherein a plurality of commentaries is available for transmission by said orator.

18. An exhibit commentary system as claimed in claim 17 wherein said orator is adapted to select one of said commentaries and to assign a channel thereto.

19. In an exhibit commentary system having an orator associated with an exhibit adapted to broadcast an audio commentary by means of a variable frequency signal and for operation in conjunction with a portable auditor responsive to receipt of the variable frequency signal to produce the audio commentary;
a line-of-sight communications link between the orator unit and auditor including
means, associated with said orator, for converting said variable frequency signal into interrupted electromagnetic radiation in a wavelength range of 1600-400 nanometers wherein ON and OFF states of said radiation are used to convey said variable frequency signal information and wherein, said auditor is adapted to detect said radiation and reproduce therefrom said variable frequency signal, wherein said orator is adapted to provide said variable frequency signals on at least three frequency range channels, at least one of said channels being a protocol channel and at least two of said channels being commentary channels, and said auditor as adapted to received said protocol channel and tunable to a selected one of said commentary channels.

20. An exhibit commentary system as claimed in claim 19 wherein said auditor is adapted to generate a frequency variable signal including a start signal on a protocol channel and to convert said signal into ON-OFF of electromagnetic radiation within said range and wherein said orator is designed to detect said last-mentioned electromagnetic radiation and reconstitute it as the frequency variable signal on said protocol channel and responsive to said signal to initiate transmission on one of said commentary channels.

21. An exhibit commentary system as claimed in claim 20 wherein said auditor is provided with means for selecting one of said commentaries and to signal said selection along with said start signal and said orator is responsive to said selection signal to transmit the auditor selected program on the orator selected channel.

22. An exhibit commentary system including an orator—associated with such exhibit and a portable auditor:
said orator being adapted to provide transmission of electromagnetic radiation in the wavelength range 1600-400 nanometers,
said auditor being designed to detect said transmission,
said orator being adapted to signal information derived from frequency variable signals through ON-OFF states of said radiation,
said auditor being adapted to detect said ON-OFF states and convert them into electrical signals,
said orator being designed, to transmit a recorded audio commentary as said information,
said auditor being designed to convert such electrical signals derived from said detection into audio signals,
wherein a plurality of auditors are each responsive to different identification codes and wherein said orator is designed to transmit a signal carrying said identification code to cause response by the receiver corresponding to said code.

23. In an exhibit commentary system, an auditor comprising:
means for detecting ON-OFF states of electromagnetic radiation in the wavelength range of 1600-400 nanometers and providing a corresponding electrical signal,
means for converting said electrical signals into an audible signal responsive to audio information signalled by said ON-OFF states,
wherein said auditor includes means for transmitting radiation in the 1600-400 nanometer range,
means in said auditor for generating frequency-variable signals,
means for converting said 33 frequency-variable signals into ON-OFF states of said auditor transmitted radiation,
wherein said means for generating frequency variable signals includes means for generating a signal uniquely identifying said auditor.

24. In an exhibit commentary system as claimed in claim 23 wherein said converting means is adapted to convert electrical signals over a predetermined bandwidth channel which is one of a plurality of said channels, and means responsive to information in said corresponding electrical signal to tune said conversion means to a channel selected by said information.

25. In an exhibit commentary system as claimed in claim 23 connectable complementary members one of which forms a part of said auditor and the other of which is mechanically separate, said separate member being designed, on connection to said one member to determine the character of a coded block of information for transmission as part of said frequency variable signals.

26. In an exhibit commentary system, an auditor comprising:
means for detecting ON-OFF states of electromagnetic radiation in the wavelength range of 1600-400 nanometers and providing a corresponding electrical signals
means for converting said electrical signals into an audible signal responsive to audio information signalled by said ON-OFF states,
wherein said auditor includes means for transmitting radiation in the 1600-400 nanometer range,
means in said auditor for generating frequency-variable signals,
means for converting said frequency-variable signals into ON-OFF states of said auditor transmitted radiation,
wherein said electrical signal converting means is adapted to convert electrical signals over a predetermined bandwidth channel which is one of a plurality of said channels, and means responsive to information in said corresponding electrical signal to tune said conversion means to a channel selected by said information.

27. In an exhibit commentary system as claimed in claim 28 wherein said auditor is adapted to transmit said start signal to said orator when pointed roughly at the orator.

28. An exhibit commentary system including an orator—associated with such exhibit and a portable auditor;
said orator being adapted to provide transmission of electromagnetic radiation in the wavelength range 1600-400 nanometers,
said auditor being designed to detect said transmission,
said orator being adapted to signal information derived from frequency variable signals through ON-OFF states of said radiation,
said auditor being adapted to detect said ON-OFF states and convert them into electrical signals,
said orator being designed, to transmit a recorded audio commentary as said information,
said auditor being designed to convert such electrical signals derived from said detection into audio signals,
wherein said auditor is selectively operable to transmit a line-of-sight start signal to said orator to initiate transmission of said audio commentary.

29. In an exhibit commentary system as claimed in claim 26 connectable complementary members one of which forms a part of said auditor and the other of which is mechanically separate, said separate member being designed, on connection to said one member to determine the character of a coded block of information for transmission as part of said frequency variable signals.

30. In an exhibit commentary system having an orator associated with an exhibit adapted to broadcast an audio commentary by means of a variable frequency signal and for operation in conjunction with a portable auditor responsive to receipt of the variable frequency signal to produce the audio commentary;
a line-of-sight communications link between the orator unit and auditor including:
means, associated with said orator, for converting said variable frequency signal into electromagnetic radiation in a wavelength range of 1600-400 nanometers wherein states of said radiation are used to convey said variable frequency signal information and wherein said auditor is adapted to detect said radiation and reproduce therefrom said variable frequency signal,
wherein said auditor is selectively operable to transmit a line-of-sight start signal to said orator to initiate transmission of said audio commentary.

31. In an exhibit commentary system as claimed in claim 30 wherein said auditor is adapted to transmit said start signal to said orator when pointed roughly at the orator.

* * * * *